April 4, 1939.   A. W. ENGEL   2,152,881
TRANSPARENT MOUNTING DEVICE
Filed Feb. 10, 1937
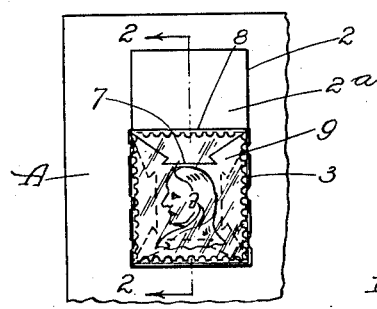
Fig.1.
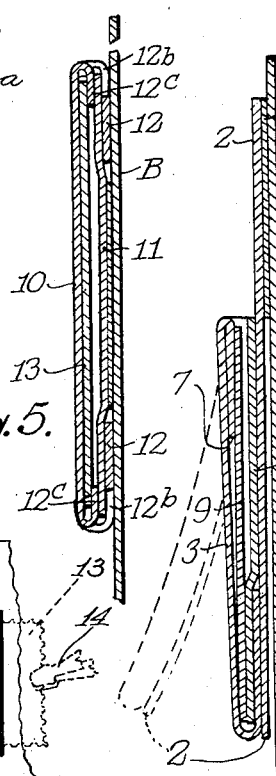
Fig.5.  Fig.2.
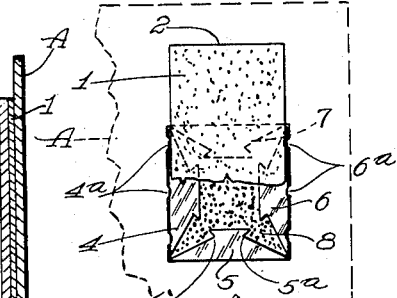
Fig.3.
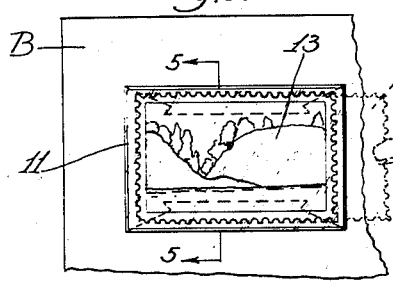
Fig.4.
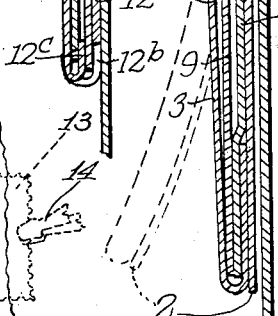
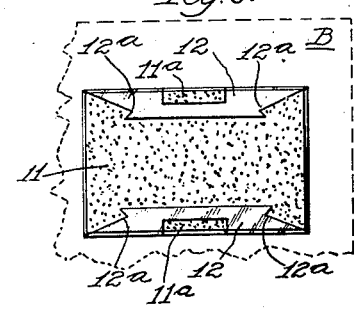
Fig.6.
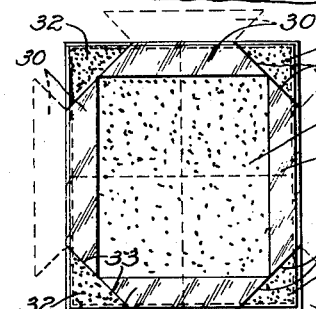
Fig.11.
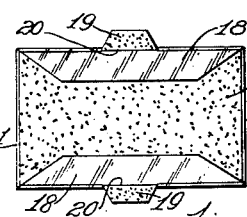
Fig.8.
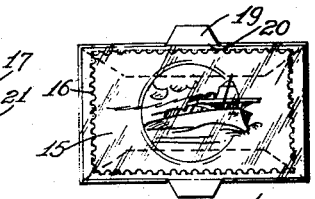
Fig.7.
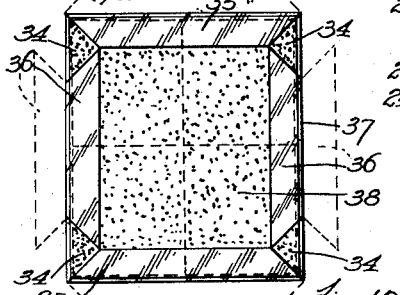
Fig.12.   Fig.10.   Fig.9.
Inventor
Albert W. Engel
by [signature]
his Attorneys.

Patented Apr. 4, 1939

2,152,881

UNITED STATES PATENT OFFICE 2,152,881

TRANSPARENT MOUNTING DEVICE

Albert W. Engel, Chicago, Ill.

Application February 10, 1937, Serial No. 124,971

13 Claims. (Cl. 40—158)

This invention relates to means for mounting cards, pictures, clippings and other items, as for example, postage stamps, constituting a philatelic collection,—certain features being particularly concerned with the proper preservation of the latter items. One object of the invention is to provide a substantially complete and transparent covering for the card, picture or stamp, so as to protect it, while at the same time leaving it wholly visible and enhancing its attractiveness. Another object is to provide such a covering designed to permit ready removal of the enclosed object. Still another object is to afford protection without rendering the covering air-tight, thus permitting ventilation so that, particularly in the case of postage stamps, the gum on the back surface shall not become adhesive. Another object is to provide a structure in which the picture or stamp may be confined either temporarily or permanently, as desired. The invention consists in certain features and elements of construction in combination, as herein shown and described and as indicated by the claims.

In the drawing:

Figure 1 is a face view of a transparent mounting device embodying this invention, shown with a fragment of a mounting sheet to which it is attached.

Figure 2 is a vertical section taken as indicated at line 2—2 on Figure 1, but on an enlarged scale.

Figure 3 is a back view of the device with the position of the mounting sheet indicated in broken outline.

Figure 4 is a face view similar to Figure 1, but showing a modified form of the invention.

Figure 5 is a vertical section taken as indicated at line 5—5 on Figure 4, on a larger scale.

Figure 6 is a back view of the structure shown in Figure 4, with the mounting sheet shown in broken outline.

Figure 7 is a face view of another modification.

Figure 8 is a back view of the device shown in Figure 7.

Figure 9 is a face view of a further modification of the invention.

Figure 10 is a back view of the structure shown in Figure 9.

Figure 11 is a back view of another modified form of mounting device within the scope of the invention.

Figure 12 shows a slight deviation from the construction of Figure 11, being a back view thereof.

For purposes of illustration I have shown the several forms of my invention as serving for the mounting of postage stamps in a philatelic collection, but it will be understood that this is only one possible use of these structures. Figures 1, 2 and 3 show a transparent device forming a pocket which may be left open at the upper edge to permit of the ready removal of the stamp or picture. A fragment of a mounting sheet, such as the leaf of a stamp album, is indicated at A, and adhesively secured thereto by means of a suitable gum coating 1 is a backing sheet 2. If desired, the gum 1 may be applied only over a limited portion of the under side of the sheet 2, so as to leave the lower portion free to be swung away from the page A, as indicated in dotted outline in Figure 2, to reveal descriptive printed or written matter which may be carried thereby, and normally concealed by the stamp. The enclosing envelope for the stamp or picture is formed of a sheet of transparent material whose main area 3 is only slightly larger than that of the stamp which it is intended to enclose.

Marginal flaps 4, 5 and 6 are folded under this area at three sides, and a fourth flap is folded down at 7. An insert sheet 8, gummed on its back surface, is disposed under the main area 3 of the transparent material, and the flaps 4, 5 and 6 are folded around three edges of the insert sheet 8, against the marginal portions of its gummed area. The fourth flap 7 may be tucked into the envelope thus formed so that it lies just inside or behind the main transparent area 3.

The envelope, consisting of the transparent sheet 3 and the opaque insert 8, embraced by the flaps 4, 5 and 6, is secured to the backing sheet 2 by means of the adhesive coating on the back of the insert 8—a generous area of this coating being left exposed between the inner edges of the flaps 4, 5 and 6, and also between their obliquely trending ends which do not meet in mitered relation but leave triangular dart-like areas of the gum surface of the member 8 exposed substantially to the corners. This gumming of the sheet 8 to the sheet 2 anchors the flaps 4, 5 and 6, even if the gum is not of a nature to become adhesively attached to the inner faces of the flaps which overlie the marginal gummed areas of the part 8. And, preferably, the ends of each of the flaps 4, 5 and 6 are formed with notched edges, as marked at 5ª, so as to interlock with the adherent areas of the parts 2 and 8 in a manner which will prevent the transparent member 3 from being displaced in its plane, or in any way loosened and shifted from its proper position.

With the three adjacent flaps 4, 5 and 6 folded around the insert 8, the air within the pocket would tend to be trapped, notwithstanding the opening at the folded edge of the flap 7, and upon cooling, this air might deposit enough condensed moisture to dampen the gum which is usually present on the back surface of a stamp such as the stamp 9, causing the latter to adhere permanently to the insert sheet 8. This would interfere with the ready removal of the stamp for sale, exchange or replacement by a better specimen, and to forestall this condition I may provide perforations, as seen at 4ª and 6ª, in the folded edges of the flaps, which will allow a relatively free circulation of air through the space within the transparent pocket, so that there will be no marked difference of temperature between air in the pocket and that outside, and thus no tendency to condensation of the moisture in the pocket.

Then the stamp, indicated at 9, is inserted past the folded edge of the flap 7, and back of said flap, between it and the insert 8. Preferably, the insert 8 is made of opaque fibrous sheet material, for example, black paper, so that its extreme marginal portion provides a background for display of the stamp 9 within the transparent envelope thus formed. With the flap 7 tucked into the envelope in front of the stamp or picture 9, as seen in Figure 1, the latter will be readily removable at will from the upper edge of the envelope, but if more permanent securement is desired the flap 7 may be tucked in over the edge of the stamp 9, so as to lie back of the stamp instead of in front of it, thus preventing the stamp from falling or slipping out of the envelope if it should be inverted. However, the material is sufficiently flexible so that the flap can be withdrawn for releasing the stamp 9, if it is desired to remove the latter. Preferably, the area of the backing member 2 is substantially greater than the area of the transparent envelope formed by attachment of the cover sheet 3 thereto, and, as seen in Figure 1, the excess of area may be disposed to extend past the upper edge of the envelope, thus providing a space at 2ª which is suitable for the entry of data relative to the stamp, 9, or other contents of the envelope.

Figures 4, 5 and 6 show a modified form of the device attached to the mounting sheet B, of which only a fragment is illustrated. In this form the device comprises merely a transparent member whose main area 10 overlies an opaque insert 11 with two marginal flaps 12, 12 folded over the gummed back surface of the member 11, as seen in Figure 6. The exposed gummed area of the insert 11 is moistened and adhesively secured directly to the mounting sheet B, thus locking the flaps 12 in position, and securing the transparent member 10 in place; and, as shown on the drawing, rectangular areas 11ª of the gummed surface of the member 11 are also exposed adjacent the folded edges of the flaps 12, through openings 12b, formed by either cutting out small rectangular areas of these flaps, or cutting them on three sides, so that the tabs 12c thus formed may be tucked between the member 11 and the main area 10 of the transparent member. If desired, the ends of the flaps may be notched at 12ª to render them still more secure against withdrawal. The omission of flaps at opposite ends of the member 10 leaves both ends of the device open for insertion or removal of a stamp, such as that shown at 13, as by means of tweezers, indicated at 14, in dotted outline, in Figure 4. These permanent openings at the opposite ends of the device also ensure the free circulation of air therethrough, thus preventing the danger of softening of the gum on the back of the stamp 13, and undesired adhesion of the stamp to the insert sheet 11.

Figures 7 and 8 illustrate another method of locking together the transparent cover member and the insert which forms a background for the enclosed stamp or picture. In Figure 7 the stamp is indicated at 15, disposed between the outer transparent cover 16 and the inserted backing sheet 17. The transparent member has flaps 18 at two opposite edges, folded over against the marginal portions of the back surface of the casing 17. But the insert is formed with gummed tabs 19 which protrude through slots 20 in the folded edges of the transparent material so that when these gummed tabs 19 are attached to a mounting surface (not shown) the transparent member is locked in place by engagement of its slots 20 with these tabs 19. This still leaves the device open at its opposite ends 21, for insertion or withdrawal of the stamp or picture 15, in the same manner as indicated in Figure 4; and this construction also affords the desirable ventilation for the space under the transparent covering, 15.

Figures 9 and 10 show a modification of the structure of Figures 7 and 8, in which the transparent cover element 22 has flaps 23 and 24 folded over at both sides, and both ends, thus engaging all four edges of the enclosed insert 25. But the insert itself is provided with small tabs 26 on all four edges, extending through slots 27 in the four folded edges of the transparent member 22, so that when these tabs 26, which are gummed on their rear faces, are adhesively secured to a mounting surface, the device is not only attached thereto but a stamp or picture, such as that indicated at 28, disposed between the transparent covering area 22 and the inserted backing 25 is permanently confined against withdrawal at any edge. This, of course, would only be suitable for a permanent collection of stamps or pictures, or for particularly valuable specimens which could be removed, if desired, by destroying the cover device, but which could not be accidentally dislodged therefrom. With all four edges of the transparent member folded over to form the flaps 23 and 24, it is desirable to perforate these folded edges at 29 to ensure adequate ventilation within the envelope.

In the devices thus far described the central area of the insert is exposed at the back, and being suitably gummed serves for securement of the insert to the mount. In each of these devices this central area is supplemented by the exposure of portions of the gummed surface nearer the extreme edges or beyond them, as in the case of the tabs 19 and 26 just described. Figures 11 and 12 show constructions in which the central gummed area is exposed as in the other forms, but in which more adequate securement is provided for at the corners. In Figure 11 the transparent cover member is formed with marginal flaps 30 folded back along portions of the edges, but with these folds stopping short of the corners. Thus, while the outer face of the transparent member may be a full rectangle, completely covering the object to be displayed therethrough (and not shown in Figures 11 and 12) the rear face of the gummed insert sheet 31 is exposed at its central area which the flaps 30 do not overlap, and is also exposed at areas 32 at each corner beyond the ends of the flaps 30.

As shown in Figure 11, the flaps 30 are of flared formation so that their extreme edges are longer than the folded edges at which they are connected with the main area of the transparent member, and the ends of the flaps are disposed obliquely, as seen at 33, so as to form a triangular area 32, bounded on two sides by the adjacent edges of the gummed insert 31. In Figure 12 the exposed areas 34, adjacent the corners of the device, are smaller, because in this form the two flaps 35 at opposite ends of the transparent member, are connected along the entire length of its folded edge, whereas only the flaps 36 at the other two sides are connected by folds 37, which stop short of the ends of the rectangle. But in either form the adhesive securement of the areas 32 or 34, to a mounting surface, serves to interlock the flaps of flared formation, such as flaps 30 and 36. A card or stamp enclosed in the device of Figure 11 will thus be permanently secured, but an object enclosed in the device of Figure 12 may be removed by withdrawing one of the end flaps 35, which will not be interlocked with the adhering areas of the insert 38.

Devices of this character will be found especially suitable for mounting larger cards or pictures, or blocks of stamps, as suggested by the broken outlines intersecting at right angles within the area of each of these figures.

I claim:

1. In combination, a cover sheet of transparent material formed with marginal flaps folded under its main area, and an insert of fibrous sheet material disposed between said main portion of the cover sheet and said flaps and gummed on its back surface for adhesive securement to another surface, said device including openings at opposite edges of said main area of the transparent cover sheet to permit circulation of air under said cover.

2. In combination, a cover sheet of transparent material formed with marginal flaps folded under its main area, and an insert of fibrous sheet material disposed between said main portion of the cover sheet and said flaps and gummed on its back surface for adhesive securement to another surface, said cover sheet having apertures in its folded edges to permit circulation of air under the cover.

3. In combination, a cover sheet of transparent material formed with marginal flaps folded under its main area, and an insert of fibrous sheet material disposed between said main portion of the cover sheet and said flaps and gummed on its back surface for adhesive securement to another surface, together with a backing member of sheet material to which the gummed surface of the insert exposed adjacent the flaps is secured, said backing member having an area exposed forwardly past a margin of the cover sheet and adapted to receive identifying data, said backing member having its back surface gummed for securement to a mount.

4. In combination, a cover sheet of transparent material formed with marginal flaps folded under its main area, and an insert of fibrous sheet material disposed between said main portion of the cover sheet and said flaps and gummed on its back surface for adhesive securement to another surface, together with a backing member of sheet material to which the gummed surfaces of the insert exposed adjacent the flaps is secured, said backing member having a portion extending past one margin of the cover sheet and being gummed on the back of said extending portion so that said member may serve as a mounting hinge for attaching the device to a supporting surface.

5. In combination, a rectangular cover sheet of transparent material formed with marginal flaps folded under its main area at two opposite edges, and an insert of fibrous sheet material disposed between said cover sheet and its flaps, said insert being gummed on its back surface and having a portion of its gummed area exposed between and adjacent said flaps for adhesive securement to a mount, the ends of said flaps being notched so that portions of their end outlines flare divergently toward the middle of the cover area, whereby the gummed areas of the insert beyond said ends of the flaps interlock the flaps with the surface to which said gummed areas are attached when the device is mounted thereon.

6. In combination, a cover sheet of transparent material formed with marginal flaps folded under its main area, and an insert of fibrous sheet material disposed between said main portion of the cover sheet and said flaps and gummed on its back surface for adhesive securement to another member, a portion of said gummed area being exposed between the edges of said flaps, and the flaps having openings adjacent their folded edges exposing additional areas of the gummed surface for adhesive securement of the assembled parts to the said other member.

7. In combination, a cover sheet of transparent material formed with marginal flaps folded under its main area, and an insert of fibrous sheet material disposed between said main portion of the cover sheet and said flaps and gummed on its back surface for adhesive securement to another member, a portion of said gummed area being exposed between the edges of said flaps, and the flaps having areas adjacent their folds defined by said folds and by additional outlines cut through the material of the flaps forming smaller flaps adapted to be tucked between the fibrous member and the main area of the transparent cover, thus exposing additional portions of the gummed area of the insert for adhesive securement of the assembled parts to said other member.

8. In combination, a cover sheet of transparent material having a marginal flap folded under its main area, and a member of fibrous sheet material disposed between said main portion of the cover sheet and its flap, said transparent material being slotted at the fold, and said member having a tab projecting through the slot for interlocking the member with the cover.

9. In combination, a rectangular cover sheet of transparent material formed with marginal flaps folded under its main area at two opposite edges, and an insert of fibrous sheet material disposed between said main portion of the cover sheet and its flaps, said transparent material being slotted at least one of said folded edges, and the insert having a tab projecting through such slot for interlocking the insert with the cover.

10. In the structure defined in claim 8, said tab being gummed on its under surface for adhesive securement to another surface, whereby the cover sheet is held in fixed relation to such other surface.

11. In combination, a rectangular cover sheet of transparent material formed with marginal flaps folded under its main area at all four sides, and an insert of fibrous sheet material disposed between said main portion of the cover sheet and said flaps, the transparent cover being slotted at each of its four folded edges, and said insert having tabs projecting through said slots respectively, said tabs being gummed on their back surfaces for adhesive securement to another surface, whereby the cover is interlocked with the insert and closed by its flaps at all four edges for retention of material disposed between the cover and the insert.

12. In combination, a rectangular cover sheet of transparent material formed with marginal flaps folded under its main area at all four sides, and an insert of fibrous sheet material disposed between said main portion of the cover sheet and said flaps, the transparent cover being slotted at one of its folded edges, and said insert having a tab projecting through said slot and gummed on its back surface for adhesive securement to another surface, whereby the cover is interlocked with the insert.

13. In combination, a rectangular cover sheet of transparent material formed with marginal flaps folded under its main area at all four sides, and an insert of fibrous sheet material disposed between said main portion of the cover sheet and said flaps, the transparent cover being slotted along the folds of at least two opposite marginal flaps, and said insert having tabs projecting through said slots and gummed on their back surfaces for adhesive securement to another surface, whereby the slots provide openings for the circulation of air under the cover, and the tabs serve to interlock the cover with the insert and to secure said parts to a mounting sheet.

ALBERT W. ENGEL.